Jan. 2, 1945.   D. B. LUTEN, JR., ET AL   2,366,538
PROCESS FOR SEPARATING PHENOLS
Filed June 2, 1942
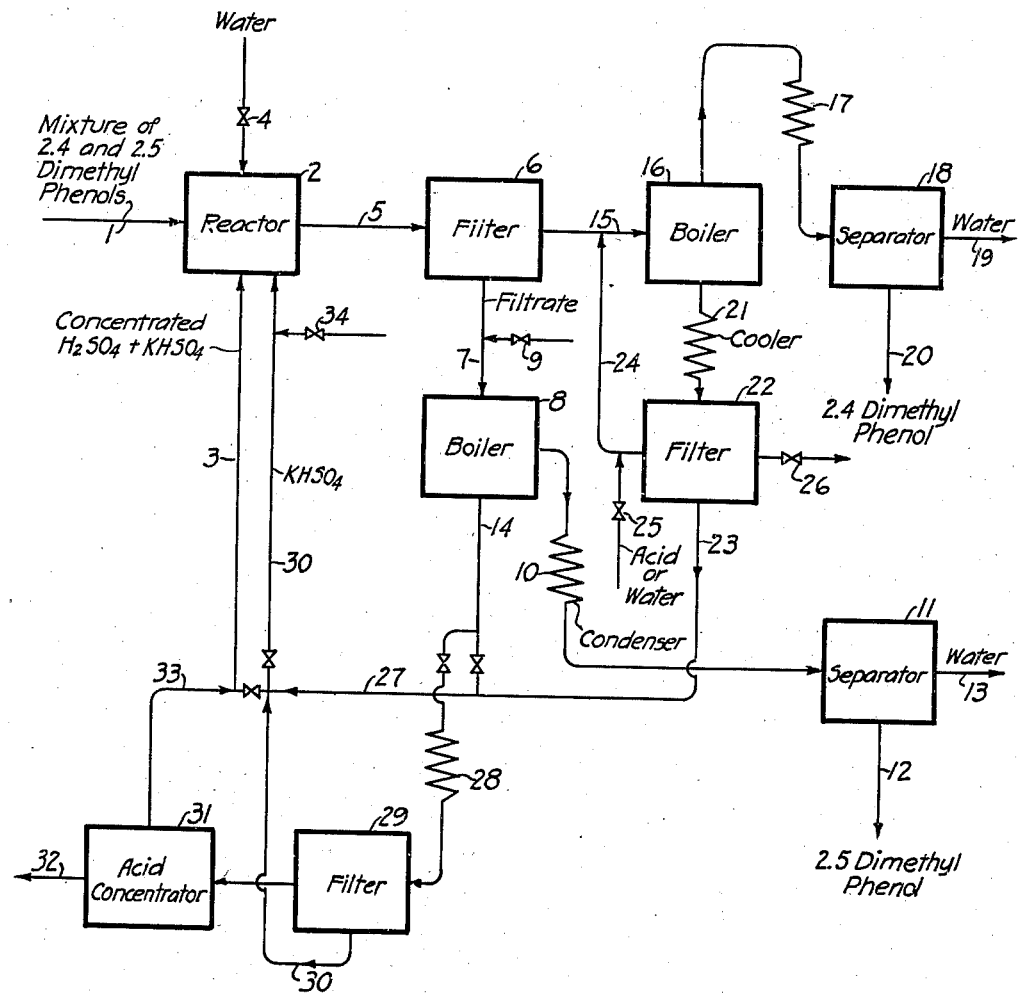
Inventors: Daniel B. Luten, Jr.
Aldo De Benedictis.
By their Attorney:

Patented Jan. 2, 1945

2,366,538

UNITED STATES PATENT OFFICE 2,366,538

PROCESS FOR SEPARATING PHENOLS

Daniel B. Luten, Jr., and Aldo De Benedictis, Berkeley, Calif., assignors to Shell Development Company, San Francisco, Calif., a corporation of Delaware Application June 2, 1942, Serial No. 445,512

4 Claims. (Cl. 260—621)

The present invention relates to a process for separating phenols from other phenols normally associated therewith in mixtures derived from petroleum, coal tar, synthetic or other sources. More particularly, it relates to an improved process for separating alkyl phenols which have such similar boiling temperatures as to make their separation by distillation very difficult or even impossible.

In the past it has been proposed to separate mixtures of phenols by a method comprising sulfonating the mixture under conditions to form a mixture of the corresponding phenol sulfonic acids and then treating the resulting sulfonation product with a solution of a basic potassium, sodium or barium compound under conditions to neutralize the product and form the corresponding salts of the various phenol sulfonic acids. The salts of the various different phenol sulfonic acids thus formed sometimes exhibit differences in solubility, which property may be utilized to effect their separation.

It is an object of our invention to provide an improved method for separating phenols. It is another object to provide a process which permits regeneration of the reagents employed for re-use in treating further quantities of phenols to be separated either in batch or continuous processes. Further objects of our invention will be evident from the following.

Our invention comprises sulfonating a mixture of phenols to be separated with an excess of sulfuric acid over the stoichiometrical equivalent of said mixture, followed by treating the phenol sulfonic acids so formed with a sulfate or acid sulfate having a cation of the alkali metal group including ammonium, or of magnesium, under conditions to cause the less soluble corresponding salts of the phenol sulfonic acids to separate, while the more soluble salts of the remaining phenol sulfonic acids remain in solution. The two phases then formed are separated, and separately subjected to hydrolysis for the recovery of the phenols from their salts in purified form, thus regenerating the sulfates and sulfuric acid, which are recycled to the process to treat further quantities of phenols to be separated, as hereinafter more fully described.

Our invention may better understood from a consideration of the figure, which represents a schematic flow diagram of this process. For simplicity of description, the alkyl phenol mixture treated is exemplified by a specific xylenol mixture.

An alkyl phenol feed mixture having an ASTM boiling range between 190 and 220° C., and containing 2,4- and 2,5-dimethyl phenols along with minor quantities of impurities (for example, an alkyl phenol fraction prepared by distilling a relatively wide boiling range alkyl phenol mixture, which latter was extracted from a cracked petroleum distillate by means of caustic alkali and recovered therefrom by springing with carbon dioxide) is fed via line 1 to reactor 2. Herein the phenolic mixture is contacted with a slurry of concentrated sulfuric acid and potassium acid sulfate admitted to reactor 2 via line 3. Reactor 2 is maintained at an elevated temperature, e. g. between about 40 and 120° C. depending on the concentration of sulfuric acid employed; the more concentrated the acid the lower the temperature required. The quantity of sulfuric acid is adjusted so that an excess of sulfuric acid over the stoichiometric equivalent of the phenols is present. Under these conditions substantially all of the alkyl phenols are converted primarily to the corresponding monosulfonic acids. The potassium acid sulfate admitted with the concentrated acid is largely insoluble and the soluble portion is substantially inert under these conditions. After the monosulfonic acids have formed, water is added to reactor 2 via valved line 4 in such an amount that the potassium acid sulfate dissolves and ionizes and potassium salts of the phenol sulfonic acids are formed which partially go into solution. The quantity of water is so regulated that the resulting solution has a concentration of approximately 15% free sulfuric acid. This concentration of acid for this particular operation affords excellent separation of the potassium salts of 2,4- and 2,5-dimethyl phenol sulfonic acids, the potassium salt of 2,4-dimethyl phenol separating as a solid while the potassium 2,5-dimethyl phenol sulfonate largely remains in the mother liquor. The resulting mixture, preferably after cooling, is passed via line 5 to filter 6 to separate the solid from the mother liquor.

The liquid filtrate is passed via line 7 to boiler 8. Water or concentrated acid may be added via valved line 9 to adjust the concentration of the filtrate to favor hydrolysis in boiler 8; or, if desired, water may be removed by preliminary distillation from boiler 8 to adjust the concentration. For this particular separation, a concentration of between about 20 and 60% sulfuric acid affords a good hydrolytic medium. Upon heating, the potassium 2,5-dimethyl phenol sulfonate is hydrolyzed whereby 2,5-dimethyl phenol and potassium acid sulfate are regenerated and the former is distilled overhead together with steam via line and condenser 10 to phase separator 11. Upon condensation, water phase is withdrawn via line 13 while the phenol phase is withdrawn via line 12, passing to storage not shown. Residual sulfuric acid and acid sulfate are returned through lines 14, 27 and 3 to reactor 2.

The solid potassium 2,4-dimethyl phenol sulfonate from filter 6 is passed via conduit 15 to boiler 16. An aqueous sulfuric acid solution of about 50% concentration is added to the potassium phenol sulfonate through line 24 to act as a hydrolytic medium. This concentration is chosen for two reasons: in the first place, in the presence of 50% sulfuric acid rapid hydrolysis of the potassium 2,4-dimethyl phenol sulfonates takes place to regenerate the 2,4-dimethyl phenol and potassium acid sulfate. In the second place, potassium acid sulfate exhibits a low solubility in acid of this strength.

In the course of the hydrolysis brought about by boiling in boiler 16, potassium acid sulfate is regenerated and is withdrawn via line and cooler 21, along with aqueous sulfuric acid solution, passing to filter 22. Solid potassium acid sulfate which has been precipitated is separated from the remaining sulfuric acid solution. The solid potassium acid sulfate is passed back to reactor 2 via conduits 23, 27 and 3, after being mixed with the slurry emanating from boiler 8 via line 14. The filtrate from filter 22 is recycled to boiler 16 via lines 24 and 15 to hydrolyze further quantities of potassium 2,4-dimethyl phenol sulfonate. If desired, filtrate may be discarded through line 26 and fresh sulfuric acid of about 50% concentration introduced through line 25.

The regenerated 2,4-dimethyl phenol emerges from boiler 16 with steam through line and condenser 17. Upon condensation, water and phenol phases are separated in separator 18, the former being withdrawn via line 19, while the latter is withdrawn via line 20, passing to storage not shown. Make-up quantities of cation-yielding electrolytes may be introduced through conduit 34.

Several variations of the basic process illustrated in the flow diagram within the scope of the present invention will be evident to those skilled in the art; e. g., the process may be readily carried out either as a batch, continuous or semi-continuous process by the addition of appropriate time tanks and other equipment required for such purposes.

Likewise, it may be desired to separate the phenols regenerated by hydrolysis in boilers 8 or 16 by solvent extraction with a substantially water-immiscible solvent, such as benzene, hydrocarbon fractions, etc., instead of recovering the phenols by steam distillation as indicated.

It may be desirable to carry out the hydrolysis by heating under pressure, although ordinary boiling is usually preferred since simultaneously the acid is concentrated and the phenols are removed along with the steam.

With regard to the specific conditions as to temperature, concentration, etc., in the various steps of the process, it is impossible to state these generally since they depend upon the particular system under consideration, i. e. the particular alkyl phenols to be separated, the anion employed in the acid sulfate, etc.

In general, it may be said the sulfonation should be carried out with relatively concentrated sulfuric acid (i. e. 70–100%) at temperatures between 0 and 150° C. or preferably between room temperature and 100° C. In general, the ratio of sulfuric acid to phenols should be between about 0.5 and 2 parts by weight of sulfuric acid per part of phenols, preferably with about equal parts of acid and phenol. Excess acid tends to shift the sulfonation equilibrium in the desired direction of complete sulfonation, and at the same time may conveniently be adjusted to result in an acidity favorable to the separation of the phenol sulfonic acid salts after the addition of the sulfate solution in the subsequent treating step. Too large an excess of very strong (e. g. fuming) sulfuric acid will result in polysulfonation. However, under the above conditions monosulfonation occurs almost completely to the exclusion of polysulfonation.

After the phenols are sulfonated the mixture is treated with an aqueous solution of a sulfate or acid sulfate of lithium, sodium, potassium, ammonium or magnesium. It is convenient to employ these sulfate or acid sulfate solutions in amounts ranging from about stoichiometrically equivalent quantities of the phenol sulfonic acids present to excesses of the order of 400%, in such concentration that the resulting mixture will have a free sulfuric acid concentration of between about 5 and 50%. Ordinarily good separation of the salts of the phenol sulfonic acid occurs in solutions of this concentration, although other concentrations may be desirable in special cases.

In carrying out the hydrolysis of the solid salts optimum acid concentration depends primarily upon the solubility of the particular salt that is regenerated in the course of the hydrolysis. In the case where potassium acid sulfate is the salt utilized and regenerated, a concentration of about 50% sulfuric acid is optimum because as mentioned before the potassium acid sulfate exhibits a minimum solubility at this concentration, which permits it to be readily separated by filtration or centrifuging so that the acid may be employed repeatedly in the hydrolysis of subsequent quantities of solid salts of the phenol sulfonic acids without carrying an excessive amount of salt in solution from cycle to cycle.

In the hydrolysis of the soluble salts of the phenol sulfonic acids contained in the mother liquor, the above consideration is not important since the acid must be concentrated in any case before re-use as a sulfonating agent, and the presence of potassium acid salt makes little difference, in cases where the handling of a slurry offers no difficulty. In case it is desired to separate the salt regenerated upon hydrolysis after the phenols are liberated and removed, it is convenient to concentrate the residual solution to a point corresponding to minimum solubility for the salt in question, followed then by the separation of the salt from the residual liquor and further concentrating the resulting mother liquor in the absence of the salt to result in acid of sulfonation strength. Since most sulfates go through solubility minima at some concentrations between about 10% and 90%, generally the concentrated acid so prepared will have no tendency to separate as crystalline sulfate and the necessity of handling a slurry may then be avoided. The acid free from solids and solid salt so obtained may then be used separately to treat further quantities of phenol sulfonic acids. Equipment to achieve such a separation is indicated on the drawing. Thus the hot acid solution from boiler 8 (assuming that it has approximately the concentration which results in minimum solubility for the sulfate) may be routed through line and cooler 28 to filter 29 where precipitated solid salt is separated. The separated solid is conveyed through conduit 30 to reactor 2. The remaining acid, free from solids, is then concentrated in acid concentrator 31, water being ejected through line 32, and acid of the desired strength returning through lines 33 and 3 to reactor 2.

In the above mode of operation a single filter may be employed in place of filters 22 and 29. In this case the sulfuric acid effluent is normally split into two portions, one passing to concentrator 31 for further concentration while the other is recycled to line 15 to hydrolyze further quantities of solid sulfonate.

In the flow diagram shown in the drawing fresh sulfuric acid and sulfate may be introduced at any of several points (not identified) which may be chosen to suit convenience. Likewise, acid or salt may be withdrawn at other points.

In general, our process is applicable to the separation of any phenolic mixture containing a plurality of phenols, the sodium, potassium, lithium, ammonium or magnesium salts of sulfonic acids of which exhibit appreciable differences in solubility in aqueous sulfuric acid solutions.

When it is desired to isolate pure phenols it is usually desirable to start with a relatively narrow boiling range mixture. In general, for this purpose the mixture treated should not contain more than one phenol whose corresponding sulfonic acid salt will precipitate under the conditions of the process, although somewhat broader fractions may be treated, usually at a sacrifice of product purity. For example, if it is desired to separate 2,4-dimethyl phenol by our process in a pure condition employing potassium acid sulfate, it is desirable that the phenolic fraction should be substantially free from para-cresol, 2-methyl 4-ethyl phenol, 2,3,6-trimethyl phenol or other higher molecular weight phenols, the potassium salts of the corresponding sulfonic acids of which tend to separate along with the potassium salt of 2,4-dimethyl phenol sulfonic acid.

It is evident that our process may sometimes be utilized serially to reduce multi-component phenolic mixtures to simpler constituent groups by first treating such a mixture to separate primary and secondary multi-component mixtures of lesser complexity, one or both of which components may be subjected to further treatment, preferably under slightly altered conditions of concentration or with some other sulfate than the one initially employed. By repetition of this process relatively wide boiling range mixtures can frequently be reduced to simplified mixtures or even individual phenols; or else, if the products resulting from the process constitute mixtures, it may be possible to separate them by simple fractional distillation.

In carrying out our process it is not necessary to employ a sulfate of sodium, potassium, lithium, ammonium or magnesium for the first cycle. Any water-soluble electrolyte including organic salts (e. g. potassium acetate, formate, etc.) which furnish the proper cation may be employed. After the first cycle the cation will be regenerated as a sulfate of the metal while the anions may be withdrawn with the products or be allowed to circulate in the system.

For example, if desired, the potassium ion can be furnished by potassium acetate, in which case the acetic acid formed would be removed with the first phenols produced and in subsequent cycles only potassium acid sulfate would be recirculated to the process.

Although any salt of the type described may be employed, we in general prefer to employ sulfates of sodium or potassium, and particularly their acid sulfates.

We claim as our invention:

1. A process for separating 2,4 and 2,5-dimethyl phenols from a mixture containing them comprising the steps of treating said mixture with sulfuric acid under conditions to convert said phenols predominantly to the corresponding phenol monosulfonic acids, adding to the resulting mixed sulfonated phenols containing a substantial amount of free sulfuric acid an aqueous solution of water-soluble electrolytes of a cation selected from the group consisting of potassium, sodium, lithium, ammonium, and magnesium in an amount between about 100% and 400% of the stoichiometrical quantity of said mixed sulfonated phenols and under conditions to form two phases, one being a solid consisting essentially of the less soluble salt of the said 2,4-dimethyl phenol sulfonic acid and the other a mother liquor containing the more soluble salt of the 2,5-dimethyl phenol sulfonic acid, sulfuric acid and water, separating said phases, subjecting the phenol sulfonic acid salt of at least one of said phases to conditions to result in the hydrolysis of the phenol sulfonate contained therein to regenerate the corresponding phenol and to form a sulfate of said cation, separating said regenerated phenol from said sulfate and recycling the latter to treat further quantities of said mixed phenol sulfonic acids.

2. A process for separating 2,4-and 2,5-dimethyl phenols from a mixture containing them comprising the steps of treating said mixture with sulfuric acid under conditions to convert said phenols predominantly to the corresponding phenol monosulfonic acids, adding to the resulting mixed sulfonated phenols containing a substantial amount of free sulfuric acid an aqueous solution of water-soluble electrolytes of a cation selected from the group consisting of potassium, sodium, lithium, ammonium, and magnesium in an amount between about 100% and 400% of the stoichiometrical quantity of said mixed sulfonated phenols and under conditions to form two phases, one being a solid consisting essentially of the less soluble salt of the said 2,4-dimethyl phenol sulfonic acid and the other a mother liquor containing the more soluble salt of the 2,5-dimethyl phenol sulfonic acid, sulfuric acid and water, separating said phases, subjecting the phenol sulfonic acid salt of at least one of said phases to conditions to result in the hydrolysis of the phenol sulfonate contained therein to regenerate the corresponding phenol and to form a sulfate of said cation, and separating said regenerated phenol from said sulfate.

3. The process of claim 2 wherein said regenerated phenols are separated from the hydrolyzed mixture by steam distillation.

4. The process of claim 2 wherein said sulfate is potassium acid sulfate.

DANIEL B. LUTEN, JR.
ALDO DE BENEDICTIS.